US008006392B2

(12) United States Patent
Moreno et al.

(10) Patent No.: US 8,006,392 B2
(45) Date of Patent: Aug. 30, 2011

(54) RECIPROCATING TOOL FOOT LOCKING ARRANGEMENT

(75) Inventors: Jaime Moreno, Arlington Heights, IL (US); Jeff Gadams, Rolling Meadows, IL (US)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 12/012,022

(22) Filed: Jan. 31, 2008

(65) Prior Publication Data

US 2009/0193667 A1    Aug. 6, 2009

(51) Int. Cl.
*B27B 9/02* (2006.01)
*B27B 21/08* (2006.01)

(52) U.S. Cl. .............................. 30/377; 30/392; 403/323

(58) Field of Classification Search ................ 30/376, 30/377, 392–394, 340; D8/64; 16/405; 248/132, 248/149, 157; 403/323, 324; 3/376, 377, 3/392–394, 340
See application file for complete search history.

(56) References Cited

U.S. PATENT DOCUMENTS

| | | | |
|---|---|---|---|
| 3,157,947 A | | 11/1964 | Oleson |
| 3,360,021 A | * | 12/1967 | Mejia ............................. D8/64 |
| 3,496,972 A | * | 2/1970 | Rees ............................. 30/376 |
| 3,528,463 A | * | 9/1970 | Mejia ............................. 30/392 |
| 5,007,172 A | | 4/1991 | Palm |
| 5,421,091 A | | 6/1995 | Gerritsen, Jr. |
| 5,555,626 A | * | 9/1996 | Fuchs ............................. 30/393 |
| 5,724,741 A | * | 3/1998 | Bednar ........................... 30/376 |
| 5,848,474 A | * | 12/1998 | Fortney et al. .................. 30/392 |
| 6,138,364 A | * | 10/2000 | Schmitz ........................... 30/392 |
| 6,234,255 B1 | * | 5/2001 | Feldmann et al. ............... 30/393 |
| 6,272,757 B1 | | 8/2001 | Roe |
| 6,308,423 B1 | | 10/2001 | Ono |
| 6,317,988 B1 | | 11/2001 | Tachibana et al. |
| 6,578,268 B2 | * | 6/2003 | Hawketts ......................... 30/392 |
| 6,671,969 B2 | | 1/2004 | Phillips et al. |
| 6,810,589 B2 | * | 11/2004 | Lagaly et al. .................... 30/392 |
| 6,851,193 B2 | | 2/2005 | Bednar et al. |
| 7,082,689 B2 | | 8/2006 | Beville et al. |

(Continued)

FOREIGN PATENT DOCUMENTS

CN         200963713        10/2007

(Continued)

OTHER PUBLICATIONS

International Search Report in PCT application No. PCT/US2009/032379, mailed Apr. 22, 2009 (5 pages).

(Continued)

*Primary Examiner* — Jason Daniel Prone
(74) *Attorney, Agent, or Firm* — Maginot, Moore & Beck

(57) ABSTRACT

A support arrangement for a reciprocating tool comprises a first locking surface configured to engage a second locking surface in a locking engagement. The first locking surface is secured to the reciprocating tool. The second locking surface is provided on a support foot assembly. A shaft extends between the first locking surface and the second locking surface. The shaft defines a shaft axis that is oriented substantially orthogonal to the tool axis. An adjustment mechanism is positioned on the shaft. The adjustment mechanism is configured to move upon the shaft and clamp the first locking surface and the second locking surface together. In at least one embodiment, a ratchet arrangement is provided in the adjustment mechanism. The ratchet arrangement limits the extent that the adjustment mechanism may be tightened to clamp the first locking surface to the second locking surface.

19 Claims, 16 Drawing Sheets

U.S. PATENT DOCUMENTS

| | | | |
|---|---|---|---|
| 7,168,169 B2 * | 1/2007 | Moreno | 30/394 |
| 7,175,456 B2 * | 2/2007 | Moreno et al. | 439/248 |
| 7,188,425 B2 * | 3/2007 | Bednar et al. | 30/377 |
| 7,310,880 B2 | 12/2007 | Hartmann | 30/377 |
| 7,395,603 B2 * | 7/2008 | Sugiura et al. | 30/377 |
| 7,426,786 B2 * | 9/2008 | Beville et al. | 30/377 |
| 7,437,824 B2 * | 10/2008 | Chreene et al. | 30/377 |
| D595,552 S * | 7/2009 | Taniguchi et al. | D8/64 |
| D612,700 S * | 3/2010 | McRoberts et al. | D8/64 |
| 7,707,729 B2 * | 5/2010 | Moreno | 30/394 |
| 7,797,841 B2 * | 9/2010 | Moreno | 30/392 |
| 2001/0034941 A1 * | 11/2001 | Bednar et al. | 30/392 |
| 2003/0110645 A1 * | 6/2003 | Phillips et al. | 30/392 |
| 2004/0187321 A1 | 9/2004 | Hartmann et al. | |
| 2005/0039339 A1 * | 2/2005 | Chen et al. | 30/392 |
| 2005/0132583 A1 * | 6/2005 | Bednar et al. | 30/392 |
| 2005/0183271 A1 | 8/2005 | Sugiura et al. | |
| 2005/0188552 A1 * | 9/2005 | Gist et al. | 30/392 |
| 2005/0246905 A1 * | 11/2005 | Tozawa et al. | 30/392 |
| 2005/0252670 A1 | 11/2005 | Prell et al. | |
| 2005/0262710 A1 | 12/2005 | Moreno | |
| 2006/0101650 A1 | 5/2006 | Beville et al. | |
| 2006/0117581 A1 * | 6/2006 | Oki et al. | 30/392 |
| 2006/0179667 A1 * | 8/2006 | Izumisawa | 30/392 |
| 2006/0260141 A1 | 11/2006 | Phillips et al. | |
| 2006/0288591 A1 * | 12/2006 | Chreene et al. | 30/392 |
| 2007/0000137 A1 | 1/2007 | Beville et al. | |
| 2007/0251104 A1 * | 11/2007 | Heinrichs et al. | 30/392 |
| 2008/0104853 A1 * | 5/2008 | Hunger | 30/392 |
| 2008/0189963 A1 * | 8/2008 | Griep et al. | 30/394 |
| 2008/0263876 A1 * | 10/2008 | Haas et al. | 30/392 |
| 2009/0100690 A1 * | 4/2009 | Delfini et al. | 30/392 |
| 2009/0113727 A1 * | 5/2009 | Chen | 30/376 |
| 2009/0113728 A1 * | 5/2009 | Oki et al. | 30/392 |
| 2009/0151174 A1 * | 6/2009 | Steingruber et al. | 30/394 |
| 2009/0193667 A1 | 8/2009 | Moreno et al. | |
| 2009/0193668 A1 * | 8/2009 | Gadams | 30/377 |
| 2011/0010951 A1 * | 1/2011 | Harrison et al. | 30/394 |
| 2011/0061245 A1 * | 3/2011 | Oberheim | 30/377 |

FOREIGN PATENT DOCUMENTS

| | | | |
|---|---|---|---|
| GB | 2288568 | | 10/1995 |
| GB | 2441401 A | * | 3/2008 |
| GB | 2443073 | | 4/2008 |
| JP | 2002052503 | | 2/2002 |
| JP | 2005226789 | | 8/2005 |
| WO | WO 2009097396 A1 | * | 8/2009 |
| WO | WO 2009097399 A1 | * | 8/2009 |

OTHER PUBLICATIONS

International Search Report in corresponding PCT application (No. PCT/US2009/032387), mailed Apr. 27, 2001 (4 pages).

* cited by examiner

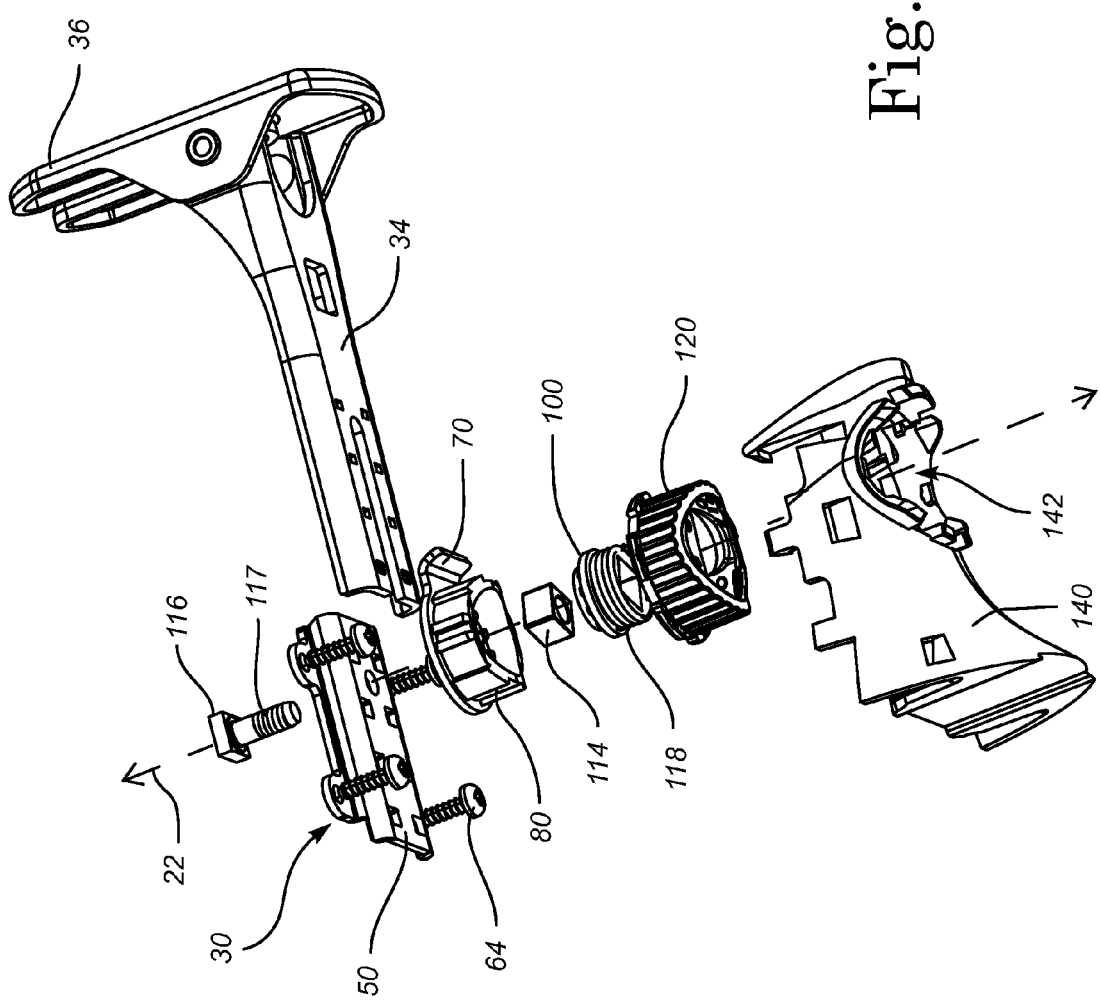

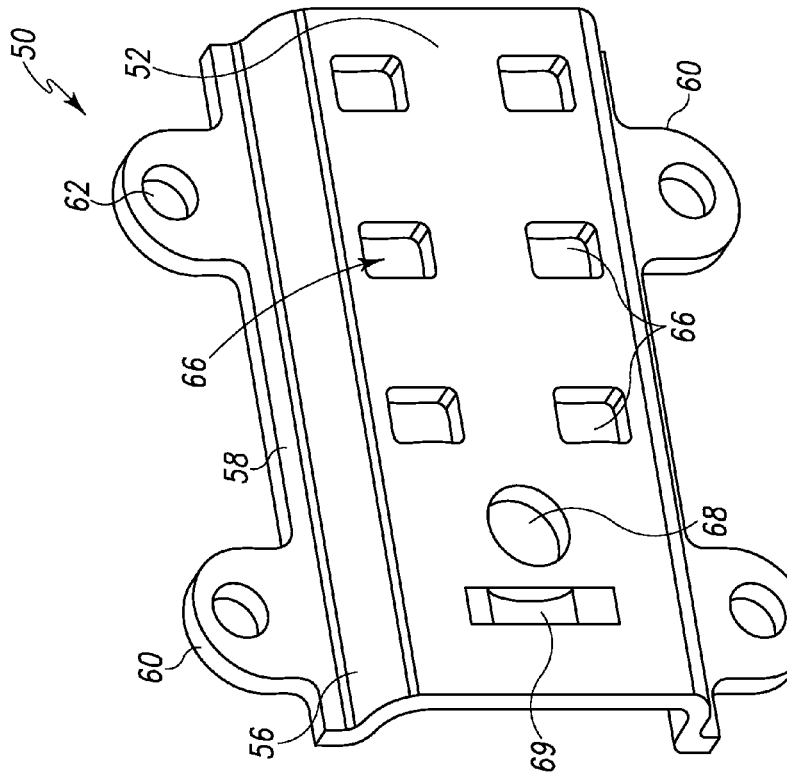
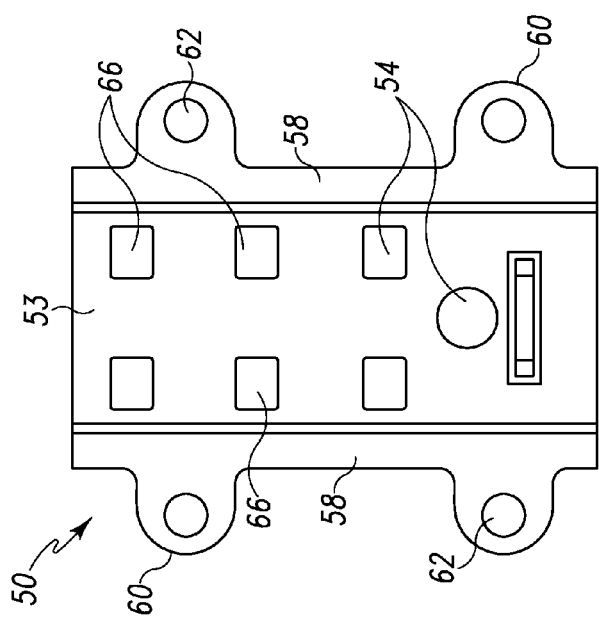
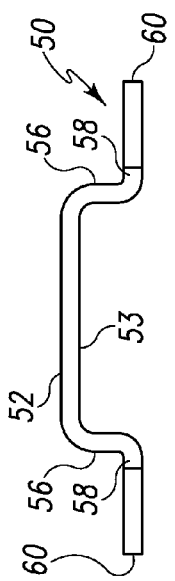

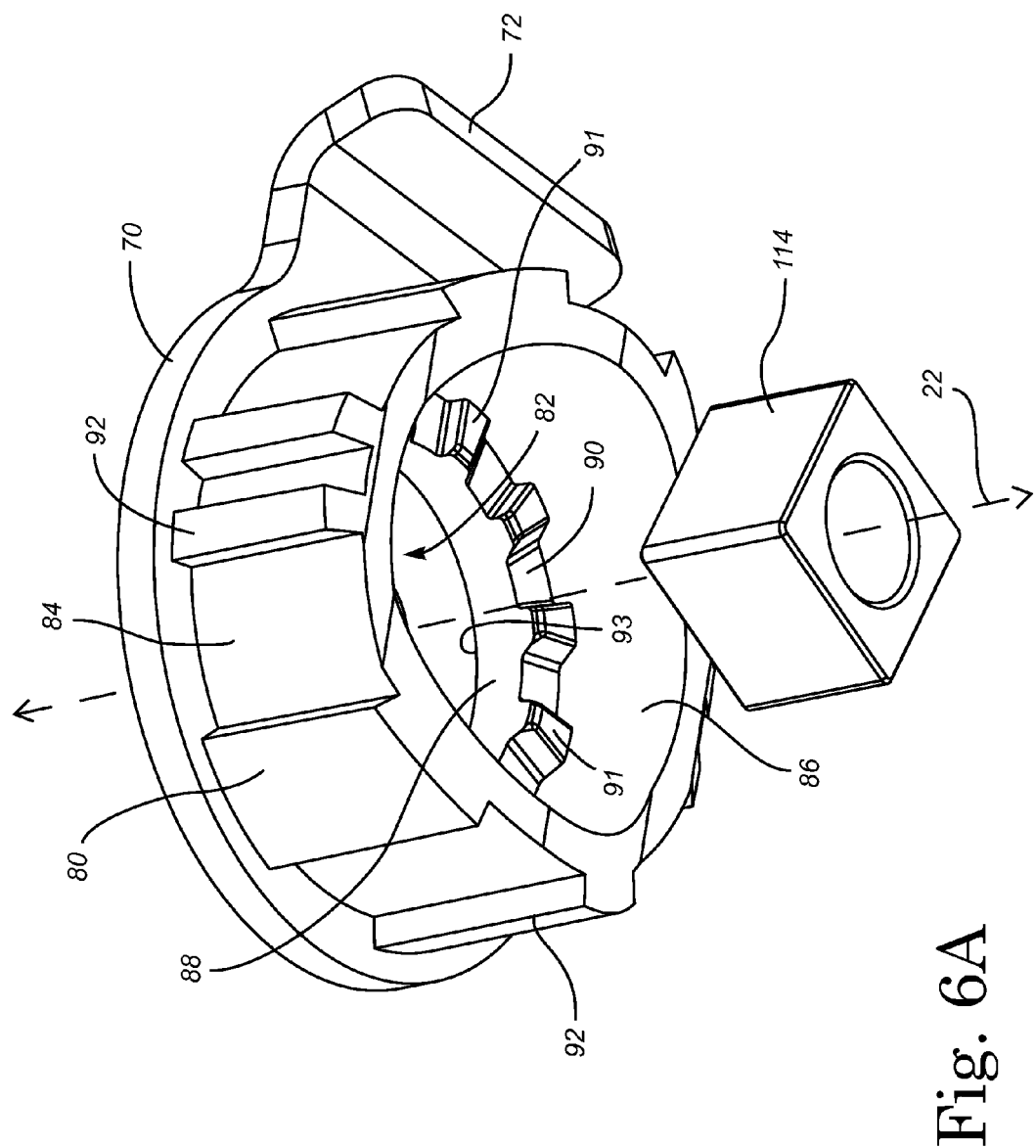

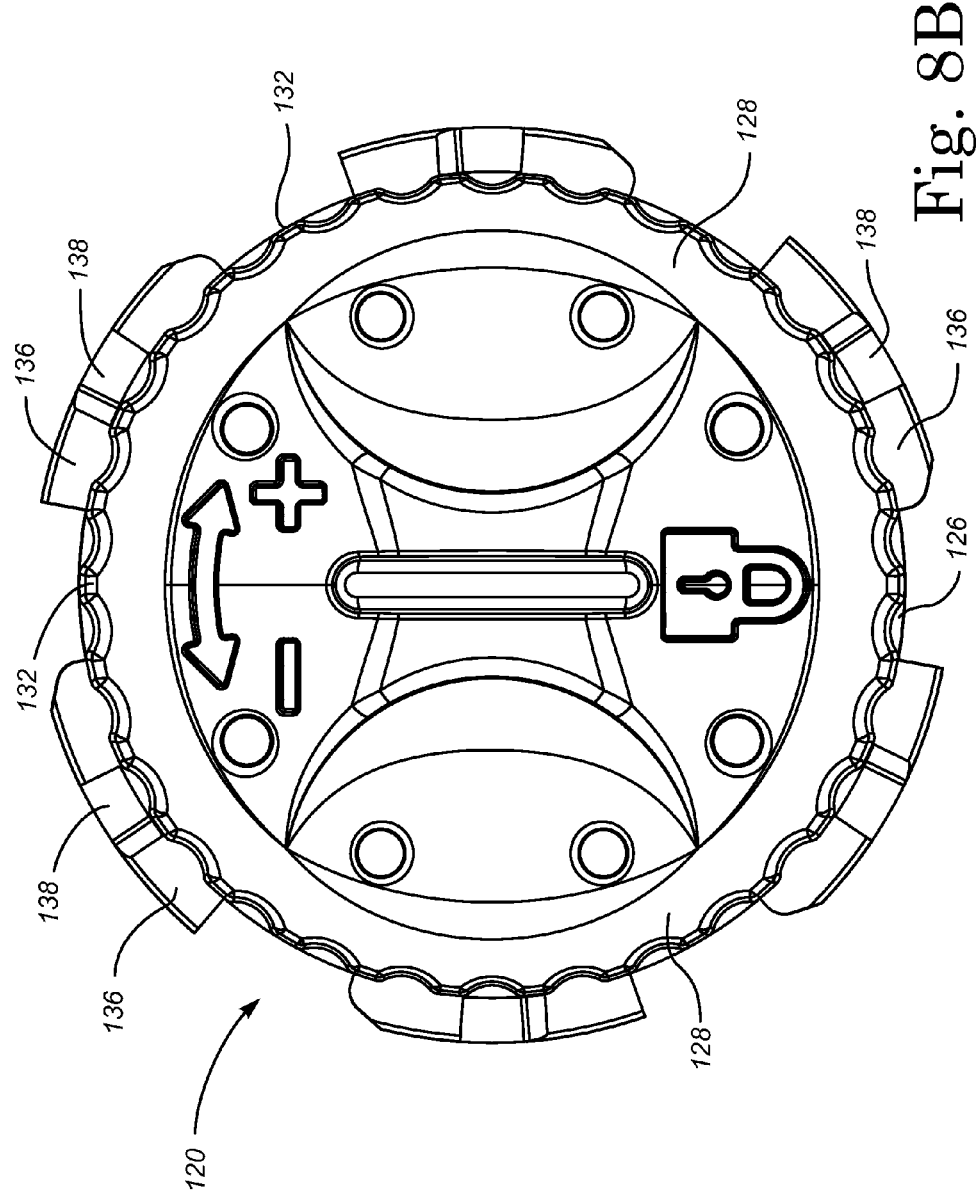

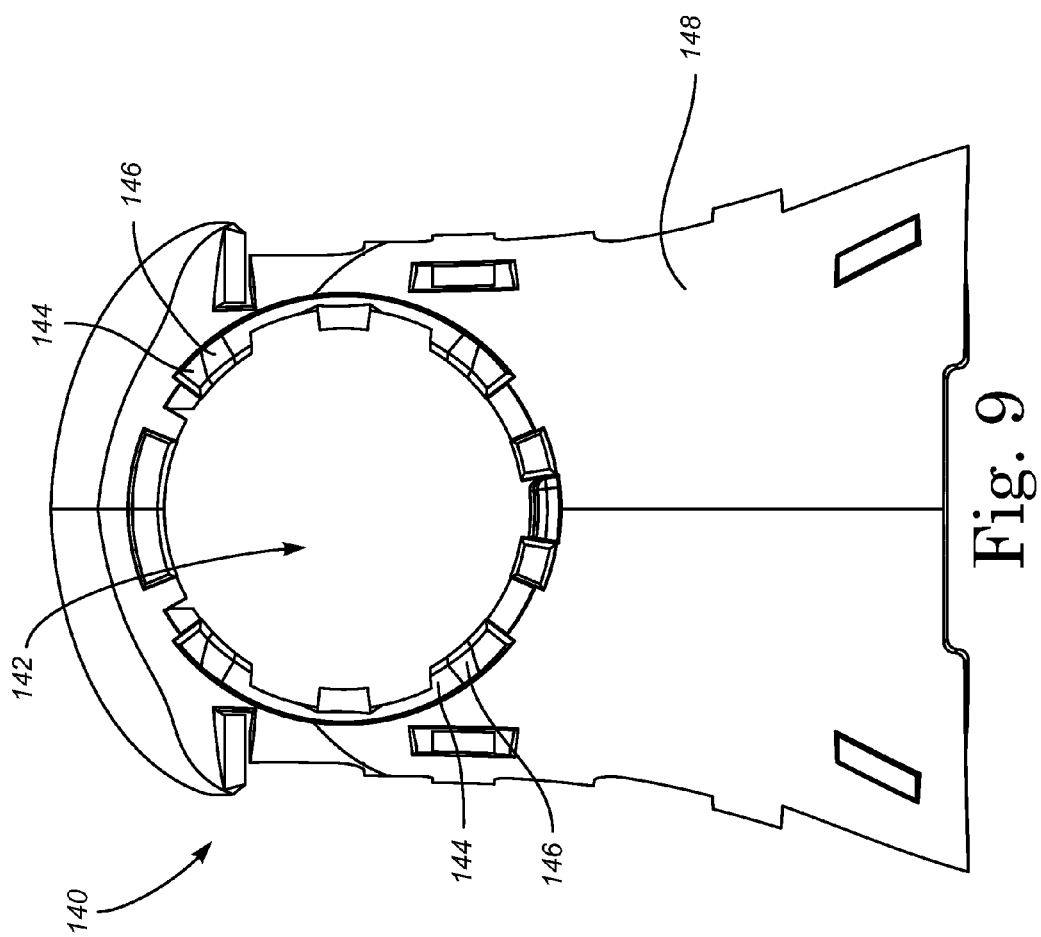

RECIPROCATING TOOL FOOT LOCKING ARRANGEMENT

CROSS-REFERENCE TO RELATED APPLICATIONS

This application is related to U.S. patent application Ser. No. 12/012,023, entitled "Support Foot Locking Arrangement for a Reciprocating Tool", which was also filed on Jan. 31, 2008, the contents of which are incorporated herein by reference.

FIELD

This invention relates to the field of power tools and particularly to reciprocating power tools having a foot support locking arrangement.

BACKGROUND

Reciprocating power tools are well known in the art. Reciprocating tools are characterized by a back-and-forth type motion of a working piece such as a blade. The most commonly known reciprocating tool may be the reciprocating saw, where a cutting action is achieved through a reciprocating motion of a blade. The term "reciprocating saw" is often generically used to refer to any power saw which cuts with a back and forth motion, such as a saber saw, jigsaw, or scroll saws. Because of the reciprocating nature of the instrument, these power saws are high vibration instruments.

Many reciprocating saws, such as the saber saw and the jigsaw, include a handle or grip area on the main housing. The handle allows the user to easily position the saw in various orientations, including positions for horizontal work and vertical work. Opposite the handle is a blade with a "foot" or "shoe" at the base of the blade. The user rests the foot against the surface being cut and applies a force against the surface to stabilize the high vibration instrument. During cutting, the stabilization provided by the foot reduces the tendency of the blade to push away from or pull towards the cut as the blade travels through its cycle, thus allowing the blade to make a cleaner cut.

The foot of the saw is often adjustable relative to the blade. In these arrangements, the foot is typically configured to telescope in and out from the main body of the saw housing. A foot guide is provided which slideably attaches to the housing of the saw, allowing the foot to move toward and away from the saw housing. This adjustable action of the foot allows the user to control the depth of the cut made with the saw. The adjustable foot also makes it possible to evenly distribute wear on the blade.

When the foot of a reciprocating saw is adjustable, secure retention of the foot upon the main housing during cutting is desirable. However, the ability to securely retain the foot upon the saw is problematic in part because of the need to maintain tolerances between the mating components related to the adjustment mechanism, e.g., the foot guide and a bracket on the saw housing engaging the foot guide. In addition to the clearances required for operation of the adjustment mechanism, additional clearances are created between the components with use of the tool as the components wear over time. For example, when the saw blade becomes caught in a work piece, forces will be transferred to the components, and any looseness between the components accelerates wear.

Accordingly, it would be desirable to provide a reciprocating tool having a support arrangement for an adjustable foot, where the support arrangement may be secured to the saw in such a way that clearances between components of the arrangement can be minimized, thus reducing wear on the components during operation of the saw. It would also be advantageous if such support arrangement could be easily adjusted such that the support arrangement may be properly secured to the reciprocating tool even after wear creates additional clearance between the components.

SUMMARY

A reciprocating tool defining a tool axis includes a support arrangement. The support arrangement comprises a first locking surface configured to engage a second locking surface in a locking engagement. The first locking surface is secured to the reciprocating tool. The second locking surface is provided on a support foot assembly. A shaft extends between the first locking surface and the second locking surface. The shaft defines a shaft axis that is oriented substantially orthogonal to the tool axis. An adjustment mechanism is positioned on the shaft. The adjustment mechanism is configured to move upon the shaft and clamp the first locking surface and the second locking surface together.

In at least one embodiment, the shaft comprises a threaded shaft and the adjustment mechanism comprises a nut threadedly engaging the shaft. A knob is coupled to the nut and rotation of the knob results in rotation of the nut on the threaded shaft. The knob is configured for rotation between an unlocked position and a locked position. In the unlocked position, a clearance is available between the first locking surface and the second locking surface in the direction of the shaft axis. The clearance is removed when the knob is moved to the locked position, and the first locking surface is again clamped to the second locking surface.

In at least one embodiment, a ratchet arrangement is provided in the adjustment mechanism. The ratchet arrangement limits the tightening of the nut to an application of a maximum torque. The ratchet arrangement may be provided between a clutch plate that engages the adjustment knob and a ratchet plate that engages the nut. In particular the clutch plate includes a first plurality of teeth that engage a second plurality of teeth on the ratchet plate. When the nut tightens on the shaft such that a threshold torque is required to move the nut further on the shaft, the teeth on the clutch plate slide over the teeth on the ratchet plate. Accordingly, further rotation of the adjustment knob does not result in further rotation of the clamping nut once the threshold torque is achieved.

The above described features and advantages, as well as others, will become more readily apparent to those of ordinary skill in the art by reference to the following detailed description and accompanying drawings. While it would be desirable to provide a reciprocating tool with a support arrangement that provides one or more of the above-mentioned or other advantageous features as may be apparent to those reviewing this disclosure, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 2 shows an exploded isometric view of a support foot locking arrangement for the support foot assembly of FIG. 1;

FIG. 3A shows a top view of a locking plate of the support foot locking arrangement of FIG. 2;

FIG. 3B shows a front view of the locking plate of FIG. 3A;

FIG. 3C shows a lower perspective view of the locking plate of FIG. 3A;

FIG. 6A shows a lower perspective view of the thrust plate, a clutch plate, and a nut of the support foot locking arrangement of FIG. 2;

FIG. 8B shows a bottom view of the adjustment knob of FIG. 8A;

FIG. 9 shows a top view of the inner surface 140 of the support plate of the support foot locking arrangement of FIG. 2;

DESCRIPTION

Figure 1:
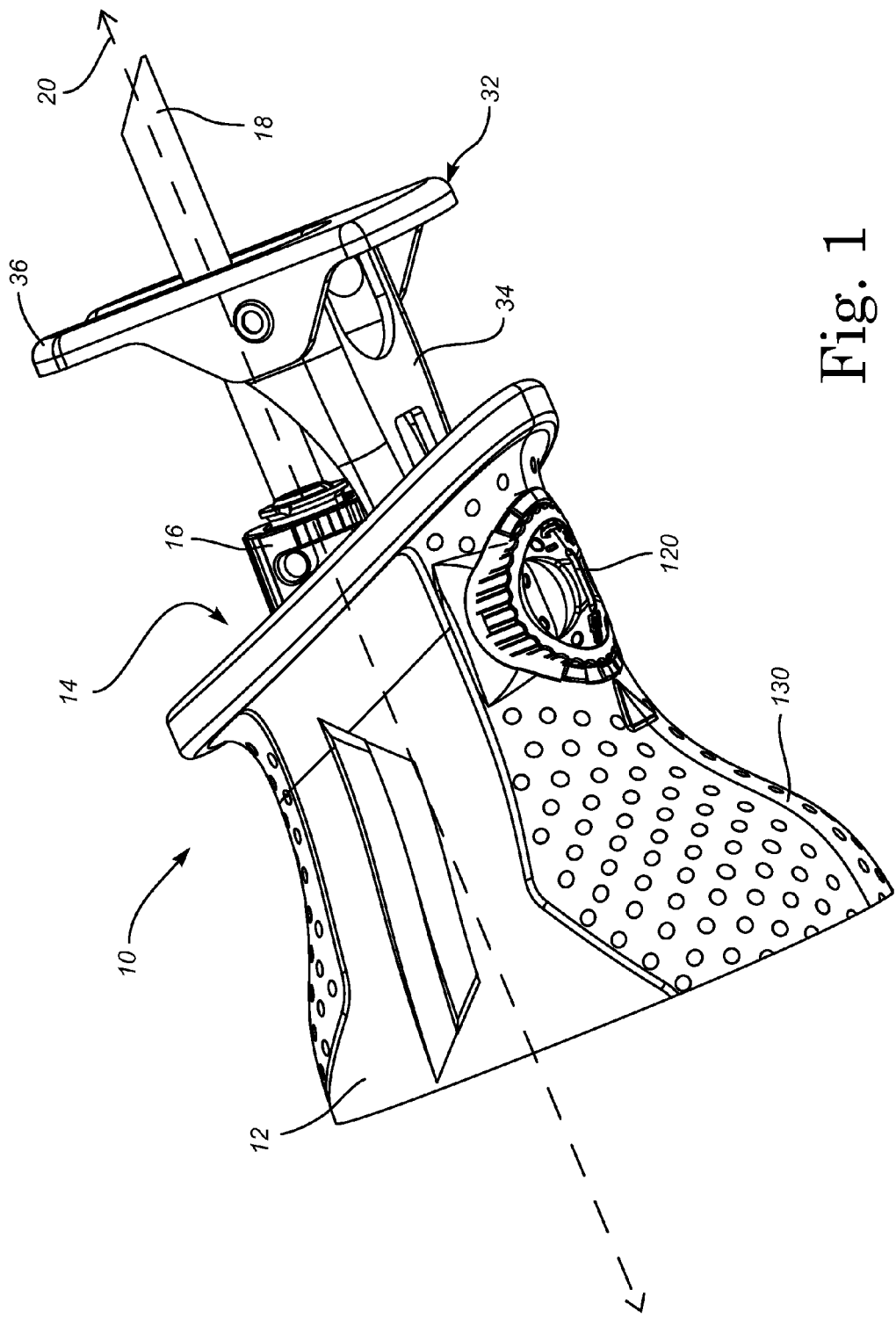
FIG. 1 shows a perspective view of a support foot assembly positioned on a reciprocating saw.

With reference to FIG. 1, an end of a reciprocating saw 10 is shown having an exemplary embodiment of a support foot locking system/arrangement 30 attached thereto. The reciprocating saw 10 includes a tool housing 12 with a motor and drive train 14 positioned therein. A chuck 16 is attached to the drive train 14. The chuck 16 is designed to hold a blade 18. The drive train 14 translates rotary motion of the motor into reciprocating motion at the chuck 16. Accordingly, the saw blade 18 retained within the chuck 16 moves back-and-forth during operation of the reciprocating saw 10, allowing the user to cut with the blade 18 of the saw. The back and forth motion of the blade 18 defines a tool axis along which the tool is designed to perform work. The tool axis is shown by axis 20 in FIG. 1.

The foot support locking arrangement 30 is secured to the housing 12 of the reciprocating saw 10. The foot support locking arrangement 30 includes a support foot assembly 32 comprising a foot 36 retained by a foot guide provided in the form of a foot guide plate 34. In the embodiment disclosed herein, the foot 36 is pivotably attached to the foot guide plate 34. In other embodiments, the foot 36 could be integral with or stationary with respect to the foot guide plate 34.

The support foot assembly 32 is adjustably secured to the reciprocating saw 10 through the foot guide plate 34. In particular, the foot guide plate 34 may be adjusted in an axial direction relative to the saw blade 18, as indicated by arrow 20. The saw blade 18 extends through a slot 38 formed in the foot 36. The support foot 36 is designed to rest against a surface such that a user may cut the surface with the portion of the blade 18 extending past the foot 36. It will be recognized that the foot 36, as well as other components of the arrangement 30, may take on numerous different configurations from that shown in the disclosed embodiment FIG. 2 shows an exploded isometric view of the support foot locking arrangement 30. As shown in FIG. 2, the foot guide plate 34 of the support foot locking arrangement 30 is positioned between a locking plate 50 and a thrust plate 70. A clutch plate 80 is positioned under the thrust plate 70. A clamping nut 114, a ratchet disc 100 and a spring 118 are provided within a center cavity of the clutch plate 80. An adjustment knob 120 engages the outer surface of the clutch plate 80. The adjustment knob 120 is positioned within a hole 142 in the support plate 140.

A locking bolt 116 extends through the locking plate 50, the foot guide plate 34, the thrust plate 70, the clutch plate 80 and the clamping nut 114. The locking bolt defines a shaft axis 22 that is oriented substantially orthogonal to the tool axis 20. The locking bolt 116 includes a lower threaded portion 117 configured to threadedly engage the clamping nut 114. The clamping nut 114 may be rotated on the locking bolt 116, moving the clamping nut 114 axially along the bolt 116 and either tightening or loosening the relationship between the components of the foot support locking arrangement 30. The components of the foot support locking arrangement 30 are generally comprised of a rigid material, such as, for example, steel or some other metal or metal alloy. Of course, those in the art will recognize that numerous other or additional materials may also be used for the components of the foot support locking arrangement 30.

With reference now to FIGS. 2 and 3A-3C, the locking plate 50 includes a rectangular locking surface 52 including a plurality of recesses 54 formed in the locking surface 52. Two sidewalls 56 extend away from the locking surface 52 in a generally perpendicular fashion. On the opposite end of each sidewall 56, a lip 58 is formed with tabs 60 protruding from the lip 58. The lips 58 and tabs 60 are oriented in a parallel fashion to the locking surface 52. The tabs 60 include holes 62 configured to receive fastening members, and particularly bolts 64 (see FIG. 2). These bolts 64 are used to secure the locking plate 50 directly to the housing 12 of the reciprocating saw, or to a mounting bracket secured to the housing of the reciprocating saw 10.

The recesses 54 in the locking surface 52 include a plurality of rectangular locking holes 66 that extend through the locking plate 50 along with a circular bore 68. The locking holes 66 are formed in two parallel rows on the locking surface 52. As explained further below, these locking holes 66 are configured to receive protrusions on the foot guide plate 34, locking the foot guide plate 34 in place relative to the locking plate 50. The circular bore 68 is configured to receive the locking bolt 116 which extends through the components of the support foot locking arrangement 30. A detent 69 is also formed in the locking plate. The detent 69 does not extend through the plate 50, but instead provides a recess in the locking surface 52, and a protrusion on the opposite side 53 of the locking surface.

Figure 4:
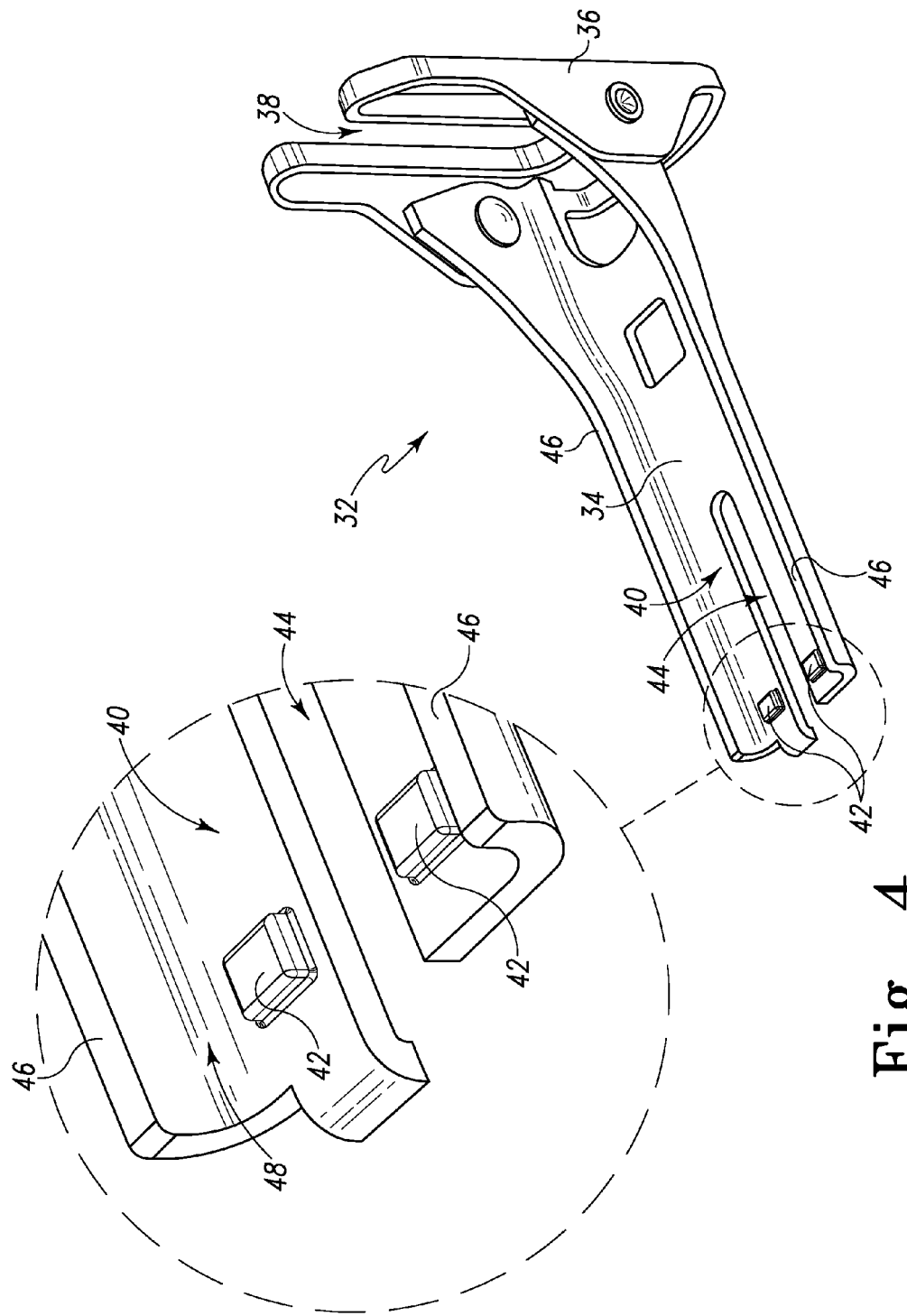
FIG. 4 shows an upper perspective view of the support foot assembly of the support foot locking arrangement of FIG. 2.

With reference now to FIGS. 2 and 4, the foot guide plate 34 of the support foot assembly 32 is configured to engage the locking surface 52 of the locking plate 50. The foot guide plate 32 includes an upper contact surface 40 with two protrusions 42 extending from the upper contact surface 40. A slot 44 is formed between the protrusions 42 and extends axially along the plate 34. The slot 44 is dimensioned such that the locking bolt 116 can pass through the foot guide plate 34 at various locations along the slot 44. Two sidewalls 46 extend in a generally perpendicular fashion from the edges of the upper contact surface 40.

The upper contact surface 40 and sidewalls 46 of the foot guide plate 34 form a channel 48 configured receive the locking plate 50. When the locking plate 50 is placed in the channel 48 with the locking surface 52 of the locking plate 50 facing the upper contact surface 40 of the foot guide plate 34, the protrusions 42 of the foot guide plate 34 may be received by the locking holes 66 of the locking plate 50. The protrusions 42 of the foot guide plate 34 mesh with the holes 66 in the locking plate 50 in an interlocking engagement, locking the two plates 34 and 50 together. The protrusions 42 are arranged to fit in each of the different holes 66 on the locking plate, thus providing an adjustable relationship between the locking plate 50 and the foot guide plate 34, where the relationship between the two plates depends on the locking holes 66 chosen by the user to mesh with the protrusions 42.

The protrusions 42 of the foot guide plate 34 are further dimensioned to fit snugly within the holes 66 of the locking plate 50. This provides a secure relationship between the locking plate 50 and the foot guide plate 34. In one embodiment, the protrusions 42 and/or holes 66 may be slightly tapered such that the protrusions 42 fit more snugly in the holes 66 as the foot guide plate 34 is forced closer to the locking plate 50. This arrangement allows the protrusions 42 to easily make initial engagement with the holes 66 of the locking plate, and secure the foot guide plate 34 in place as it is forced into closer interlocking contact with the locking plate 50.

In the disclosed embodiment of FIG. 4, two rectangular protrusions 42 are shown on the foot guide plate 34 and spaced apart to fit precisely within the equally separated and complimentary sized rectangular holes 66 of the locking plate 50. It will be recognized that in other embodiments different numbers of protrusions and/or holes may be used on the locking plate 50 and the foot guide plate 34. In addition, it will be recognized that different protrusion/hole configurations are possible, and different types of locking relationships are also possible.

Figure 5:
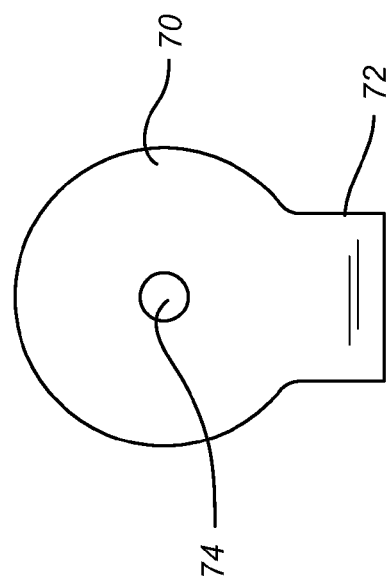
FIG. 5 shows a top view of a thrust plate of the support foot locking arrangement of FIG. 2.

With reference now to FIGS. 2 and 5, the thrust plate 70 is a generally flat disc with a tongue 72 projecting radially outward. A hole 74 is formed in the center of the thrust plate 70 to allow the locking bolt 114 to extend through the thrust plate. As best seen in FIG. 2, when arranged on the reciprocating tool 10, the tongue 72 extends outward from the thrust plate 70 on the side of the thrust plate that that faces the support foot 36. In addition to extending outward, the tongue 72 also extends downward, away from the foot guide plate 34. This outward and downward curve on the tongue 72 provides a funneled channel leading to the space between the locking plate 50 and the thrust plate 70. This funneled channel is provided to assist the user in inserting the foot guide plate 34 between the locking plate 50 and the thrust plate 70.

Figure 6B:
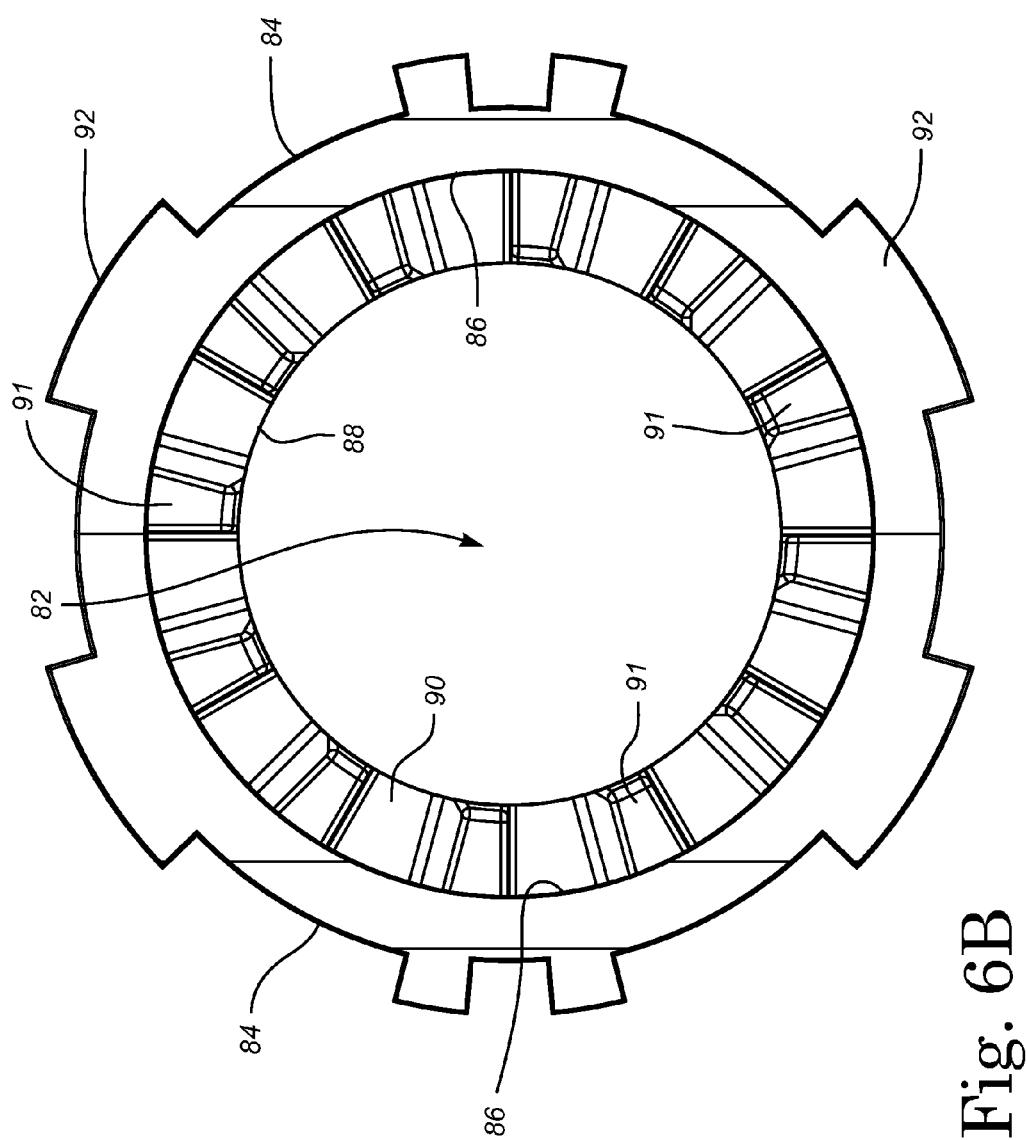
FIG. 6B shows a bottom view of the clutch plate of FIG. 6A.

With reference now to FIGS. 2, 6A and 6B, the clutch plate 80 is provided as a cylindrical disc. The clutch plate 80 includes a central hole 82, an outer wall 84 and an inner wall 86, the inner wall defining an interior cavity of the clutch plate 80. A circular lip 93 is provided at the top portion of the interior cavity of the clutch plate 80. This circular lip 93 provides a race 88 along the inner wall 86 of the clutch plate 80, with the diameter of the interior cavity being smaller at the race than at other portions of the clutch plate. The race 88 includes a toothed surface 90 near the upper portion of the clutch plate 80 with the toothed surface 90 facing toward the lower portion of the clutch plate 80. Other than the toothed surface 90 on the race 88, the inner wall 86 of the clutch plate 80 is relatively smooth. By contrast, the outer wall 84 of the clutch plate 80 includes a plurality of ribs 92, which add contour along the outer wall 84 of the clutch plate.

Figure 7:
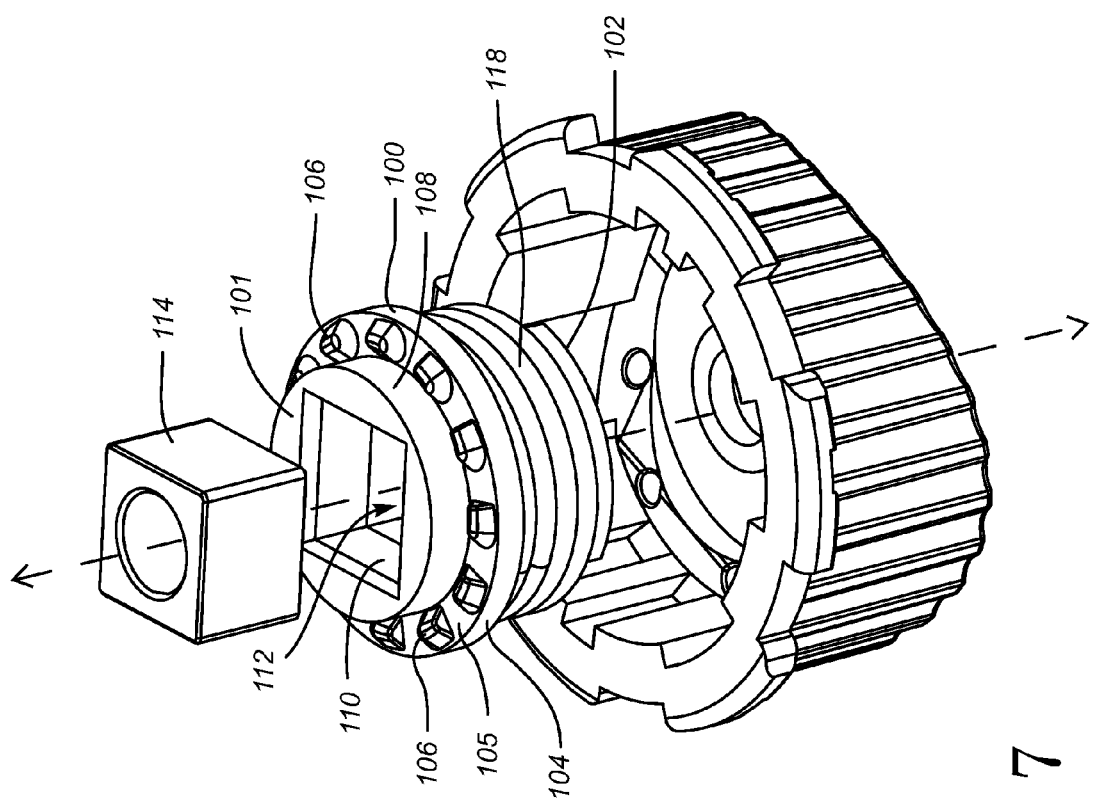
FIG. 7 shows an upper perspective view of a ratchet disc of the support foot locking arrangement of FIG. 2.
Figure 8A:
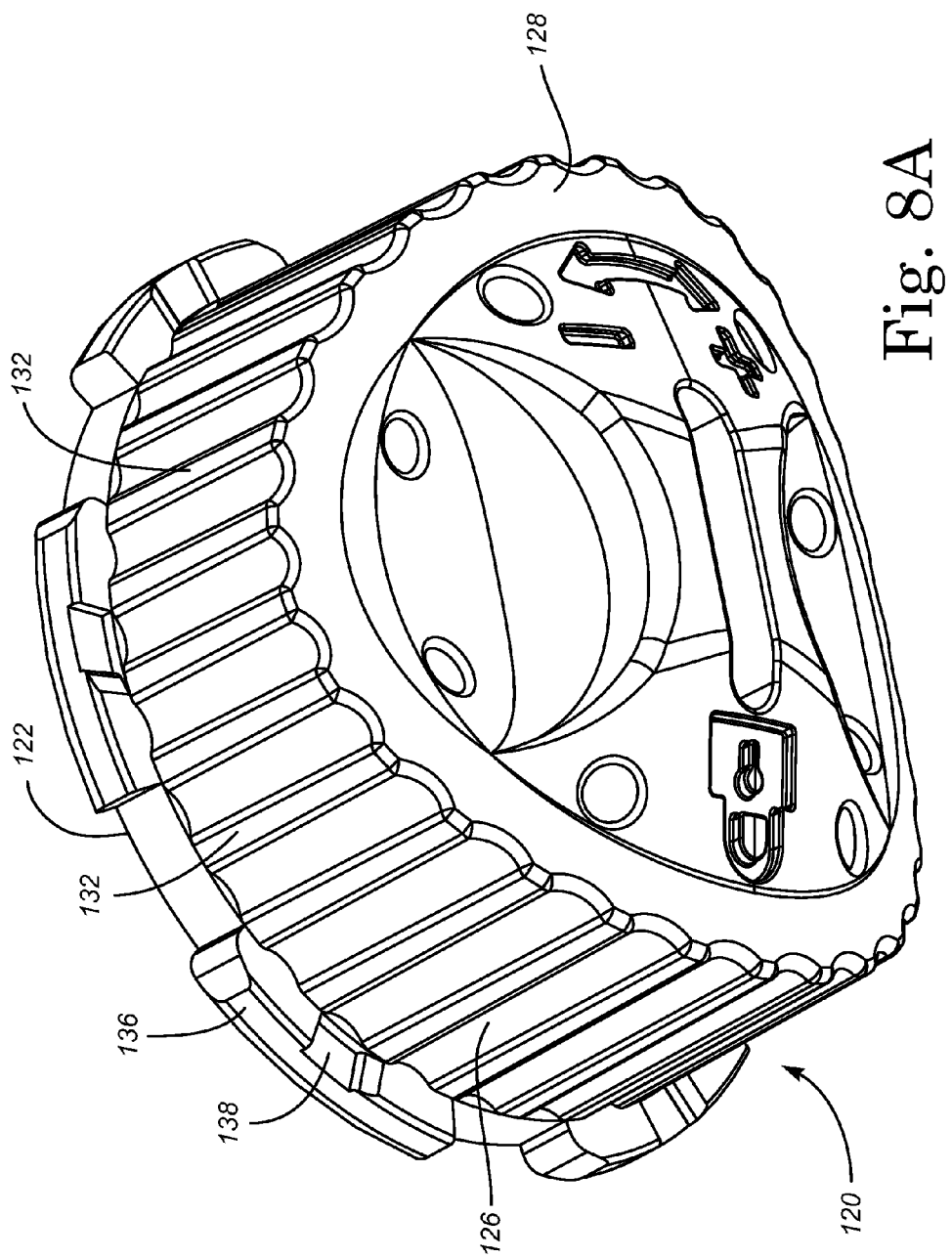
FIG. 8A shows a lower perspective view of an adjustment knob of the support foot locking arrangement of FIG. 2.
Figure 8C:
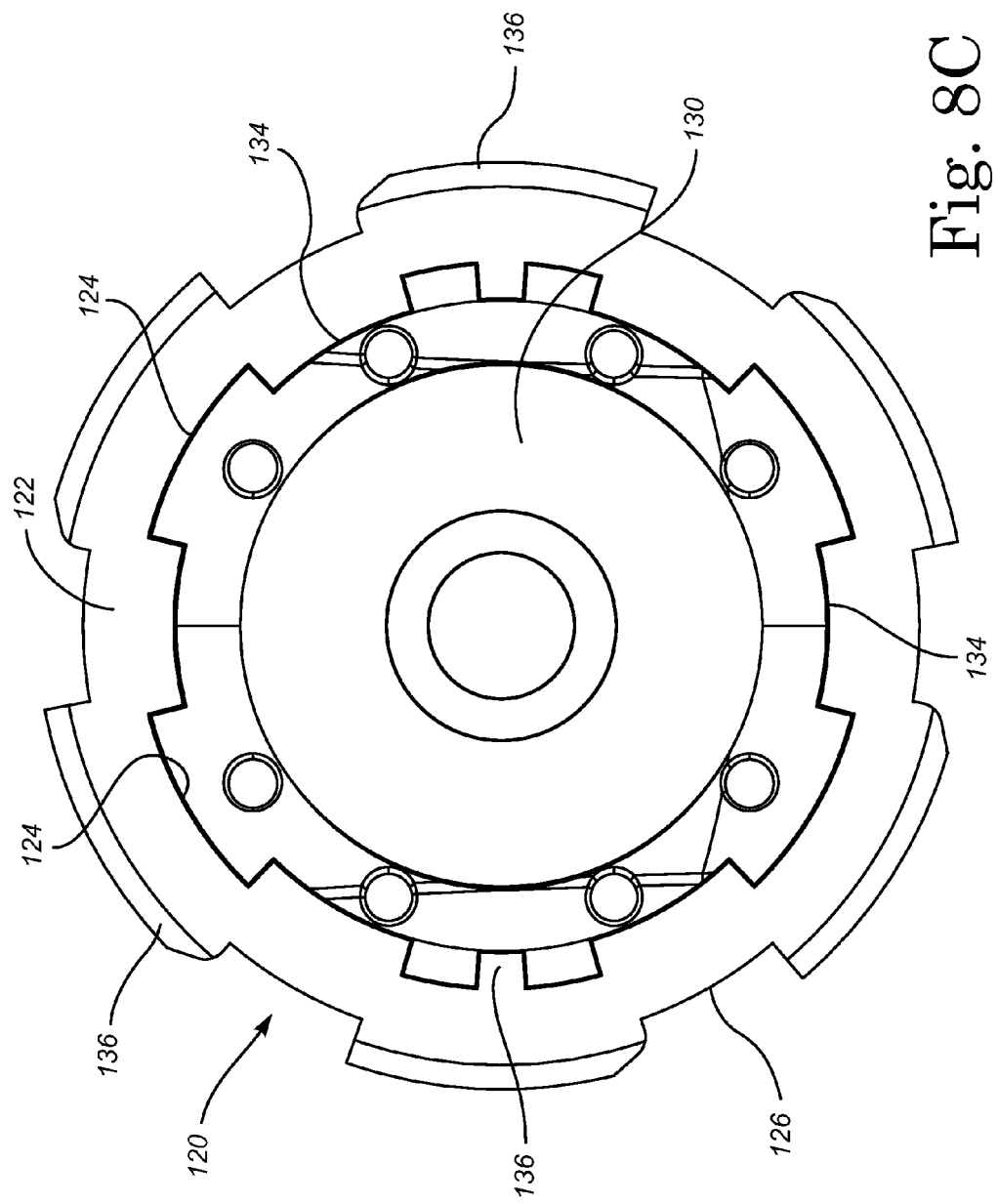
FIG. 8C shows a top view of the adjustment knob of FIG. 8A.

With reference now to FIGS. 2 and 7, the ratchet disc 100 is provided as a cylindrical member with a first end 101, a second end 102 and an outer skirt 104 positioned between the first end 101 and the second end 102. A plurality of teeth 106 are included on the outer skirt 104. The ratchet disc 100 is further defined by a circular outer wall 108 and polygonal inner wall 110 that defines a polygonal void 112, such as the square shaped void 112 shown in FIG. 7.

The first end 101 of the ratchet disc 100 fits within the interior diameter of the race 88 of the clutch plate 80. The skirt 104 of the ratchet disc is positioned within the central hole 82 of the clutch plate 80. The skirt 104 includes a ratchet face 105 with a plurality of teeth 106. When the ratchet disc 100 is inserted into the clutch plate 80, the ratchet face 105 engages the toothed surface 90 of the race 88 of the clutch plate 80. A cylindrical space is formed between the second end 102 of the ratchet disc 100 and the inner wall 86 of the clutch 80. This cylindrical space is dimensioned to receive one end of the spring 118.

The clamping nut 114 is positioned at the inside of the ratchet disc 100 within the polygonal void 112. The polygonal void 112 is shaped to match the shape of the clamping nut 114 such that the clamping nut fits snugly within the polygonal void. Rotation of the ratchet disc 100 also imparts rotation to the clamping nut 114. The clamping nut 114 threadedly engages the threaded portion 117 of the bolt 116 and rotation of the clamping nut 114 causes the nut 114 to move along the bolt 116 in the direction of the axial shaft 22 of the bolt 116. When the clamping nut 114 is rotated clockwise, it moves up the bolt 116, forcing the thrust plate 70 toward the locking plate 50, and clamping the foot guide plate 34 between the thrust plate 70 and the locking plate 50. When the nut 114 is rotated counter-clockwise, the thrust plate 70 is allowed to move away from the locking plate 50, and clearance is introduced between the locking plate 50 and the foot guide plate 34. This clearance allows the foot guide plate 34 to slide within or completely out of the space between the locking plate 50 and the thrust plate 70.

With reference now to FIGS. 2, 8A-8C, the adjustment knob 120 is a generally cylindrical disc including an upper rim 122, an interior cylindrical surface 124, an exterior cylindrical surface 126, and a lower rim 128 and floor 130 opposite the upper rim 122. The adjustment knob 120 is configured to fit within a hole 142 in the support plate 140.

The exterior cylindrical surface 126 of the adjustment knob 120 includes a plurality of longitudinal ribs 132. These exterior ribs 132 provide a grooved gripping surface for the fingers of a user, assisting the user in turning the adjustment knob 120. The interior cylindrical surface of the adjustment knob 120 includes a plurality of interior ribs 134 configured to abut the ribs 92 on the clutch plate 80. In particular, rotation of the adjustment knob 120 about the axis 22 of the shaft causes the interior ribs 134 on the interior surface 124 of the adjustment knob 120 to contact the ribs 92 on the outer wall 84 of the clutch plate 80, resulting in rotation of the clutch plate 80.

The upper rim 122 of the adjustment knob 120 includes a plurality of tabs 136. The tabs 136 are configured to fit between teeth 144 provided around the hole 142 of the support plate 140. This relationship between the tabs 136 of the clutch plate 120 and the teeth 144 of the support plate 140 allows the adjustment knob 120 to be keyed within the support plate 140. In particular, if the adjustment knob 120 is to pass through the hole 142 in the support plate 140, the tabs 136 on the adjustment knob 120 are first aligned with the spaces between the teeth 144 of the hole 142. The adjustment knob 120 may then be passed through the hole 142 in the direction of the shaft axis 22 without the teeth 144 of the support plate 140 interfering with the tabs 136 of the adjustment knob 120 during such passage.

With reference now to FIGS. 2 and 9, the support plate 140 is provided as a portion of the reciprocating saw housing 12. In particular, the support plate 140 forms a lower portion of the housing 12 below the reciprocating chuck 16 (see FIG. 1). The support plate 140 is generally a contoured panel that provides a lower gripping surface for the reciprocating saw 10 near the mouth of the housing 12. The support plate 140 is fastened to the rest of the housing 12 using fastening means such as bolts (not shown). Alternatively, the support plate 140 may be integrally formed with other portions of the saw housing 12.

As shown in FIG. 9, the interior surface 148 of the support plate 140 includes elongated bumps 146 that are oriented in a radial direction from the hole 142 of the support plate 140. Each bump 146 is positioned near the center of one of the teeth 144 surrounding the hole 142 in the support plate 140. These radial bumps 146 are configured to engage radial slots or grooves 138 (see FIG. 8B) formed on the tabs 136 of the adjustment knob 120.

The adjustment knob 120 is configured to move between an open and closed position. In the open position, the adjustment knob 120 is substantially outside of the hole 142 and protrudes out from the support plate 140. In the closed position, the adjustment knob 120 is moved into the hole 142 in the support plate 140 and rotated such that the radial grooves 138 on the adjustment knob engage the radial bumps 146 on the support plate 140.

The spring 118 is positioned between the outer wall 108 on the second end 102 of the ratchet disc 100 and the inner wall 86 of the clutch plate 80. The spring 118 extends between the skirt 104 of the ratchet disc 100 and the floor 130 of the adjustment knob 120. This positioning of the spring 118 biases the adjustment knob 120 outward from the support plate 130. When the adjustment knob 120 is in the closed position, the spring 118 is compressed, forcing the radial bumps 146 on the support plate 140 into close engagement with the radial grooves 138 on the adjustment knob 120. When the user rotates the adjustment knob 120 from the closed position, the tabs 136 on the adjustment knob 120 move into the spaces between the teeth 144 of the support plate 140. With the tabs 136 positioned between the teeth 144, the spring 118 forces the adjustment knob 120 out the hole 142 of the support plate 140.

In operation, the adjustment knob 120 is used to lock the foot guide plate 34 to the locking plate 50 or loosen the foot guide plate 34 from the locking plate 50. If the user wishes to lock the foot guide plate 34 to the locking plate 50, the user rotates the adjustment knob 120 in a clockwise direction, causing the interior ribs 134 of the adjustment knob 120 to contact the outer ribs 92 of the clutch plate 80, and impart rotation to the clutch plate 80. When the clutch plate 80 is rotated, the teeth 91 on the toothed face 90 of the clutch plate 80 engage the teeth 106 on the skirt 104 of the ratchet disc 100, resulting in rotation of the ratchet disc. As discussed previously, clockwise rotation of the ratchet disc 100 results in clockwise rotation of the clamping nut 114, causing the clamping nut 114 to move along the shaft of the bolt 116 toward the thrust plate 70. This movement of the clamping nut 114 forces the thrust plate 70 toward the locking plate 50 and clamps the foot guide plate 34 between the locking plate 50 and the thrust plate 70.

As also discussed previously, the ratchet arrangement between the clutch plate 80 and the ratchet disc 100 only allows the clamping nut 114 to be tightened a maximum amount. In particular, when the clamping nut 114 is tightened to the extent that the application of a threshold torque is required to further tighten the nut 114 on the shaft 116, the ratchet mechanism prevents further tightening of the clamping nut 114 regardless of the degree of additional knob 120 rotation. When this threshold torque is required to rotate the clamping nut 114 an additional amount, the teeth 91 of the clutch plate 80 are configured to slide over the teeth 106 of the ratchet disc 100. As a result, additional rotation of the clutch plate 80 does not result in additional rotation of the ratchet disc 100 or the clamping nut 114.

Once the adjustment knob 120 is rotated to the extent that the threshold torque is applied to the clamping nut 114, the ratchet arrangement begins to click upon further rotation of the adjustment knob 120, as the teeth 91 and 106 slide over one another. This clicking noise indicates to the user that the adjustment knob 120 has been rotated to the extent that it has locked the foot guide plate 34 in place, and the adjustment knob 120 should now be moved to the closed position.

To move the adjustment knob 120 to the closed position, the tabs 136 on the adjustment knob 120 are first aligned with the spaces between the teeth 144 of the support plate 50. The user then presses the adjustment knob 120 inward, toward the locking plate 140, compressing the spring 118 and causing the adjustment knob 120 to move into the hole 142 of the support plate 140. While continuing to press inward, the user then rotates the adjustment knob 120 until the grooves 138 in the tabs 136 of the adjustment knob 120 are aligned with the radial bumps 146 on the teeth 144 of the support plate 140. The adjustment knob 120 is then released, and the spring 118 seats the adjustment knob 120 on the support plate 140 with the grooves 138 of the adjustment knob engaging the radial bumps 146 of the support plate 140, thus placing the adjustment knob in a closed position.

Figure 10:
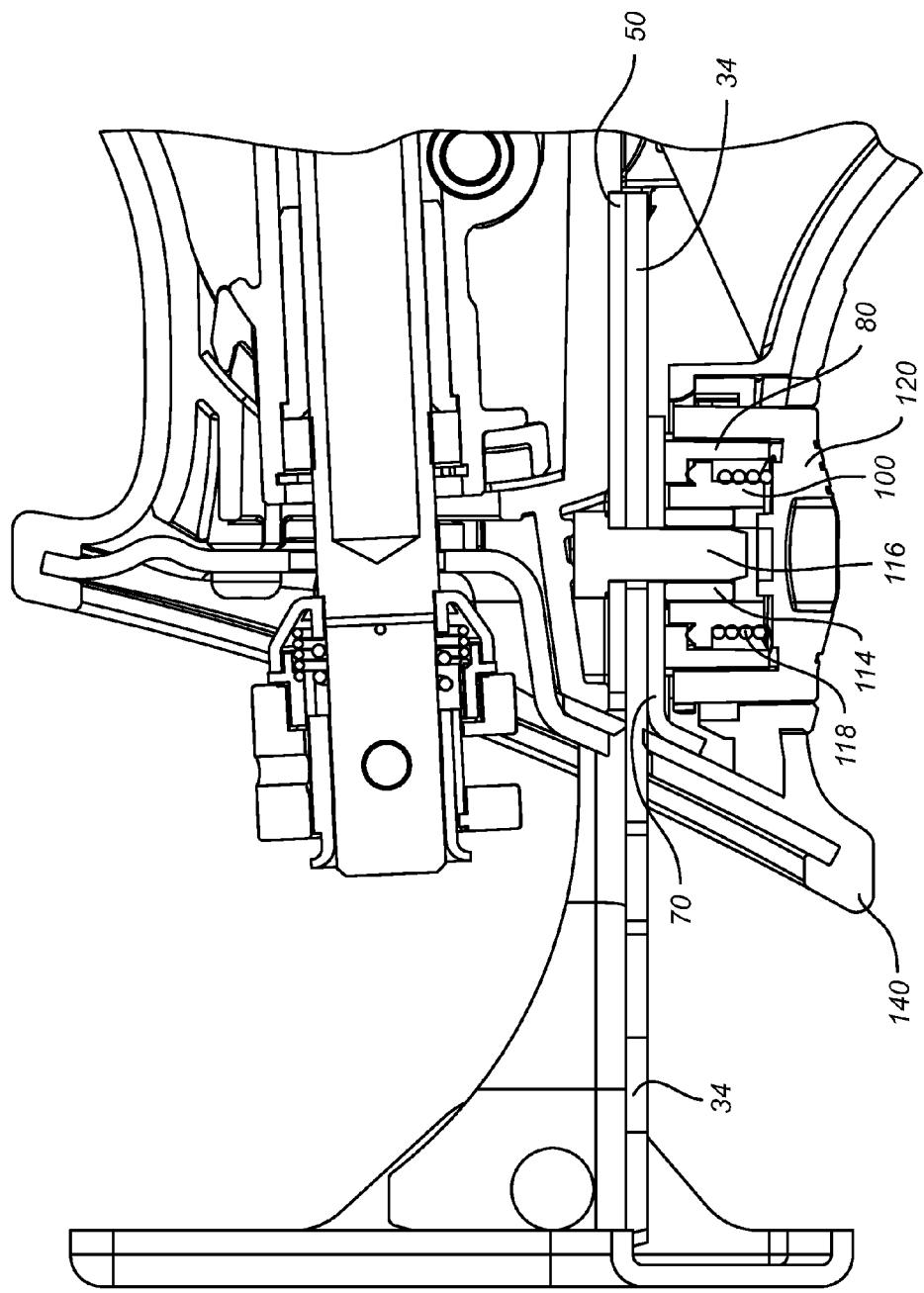
FIG. 10 shows a cross-sectional view of the assembled support foot locking arrangement of FIG. 2 positioned in a reciprocating saw.

With the adjustment knob 120 in the closed position, the support plate 140 prevents the adjustment knob 120 from loosening due to tool vibration during operation of the tool. Furthermore, with the adjustment knob 120 in the closed position, the adjustment knob 120 is withdrawn into the support plate 140, allowing the support plate to provide a comfortable gripping surface to the user. FIG. 10 shows a cross-sectional view of the support foot locking arrangement 30 positioned in a reciprocating saw with the adjustment knob 120 in the closed position.

To unlock the foot guide plate 34, the user rotates the adjusting knob 120 clockwise until the tabs 136 disengage the keyed teeth 144 in the support plate 140 and the spring 118 forces the adjusting knob 120 outward from the support plate gripping surface. The user is then free to rotate the adjusting knob 120 counter-clockwise in order to unlock the clamping nut by loosening the clamping nut 114 from the clamped position and providing clearance between the thrust plate 70 and the locking plate 50. With sufficient clearance provided between the locking plate 50 and the thrust plate 70, the foot guide plate 34 may be adjusted within the support foot assembly 32 or even removed from the tool 10.

Figure 11:
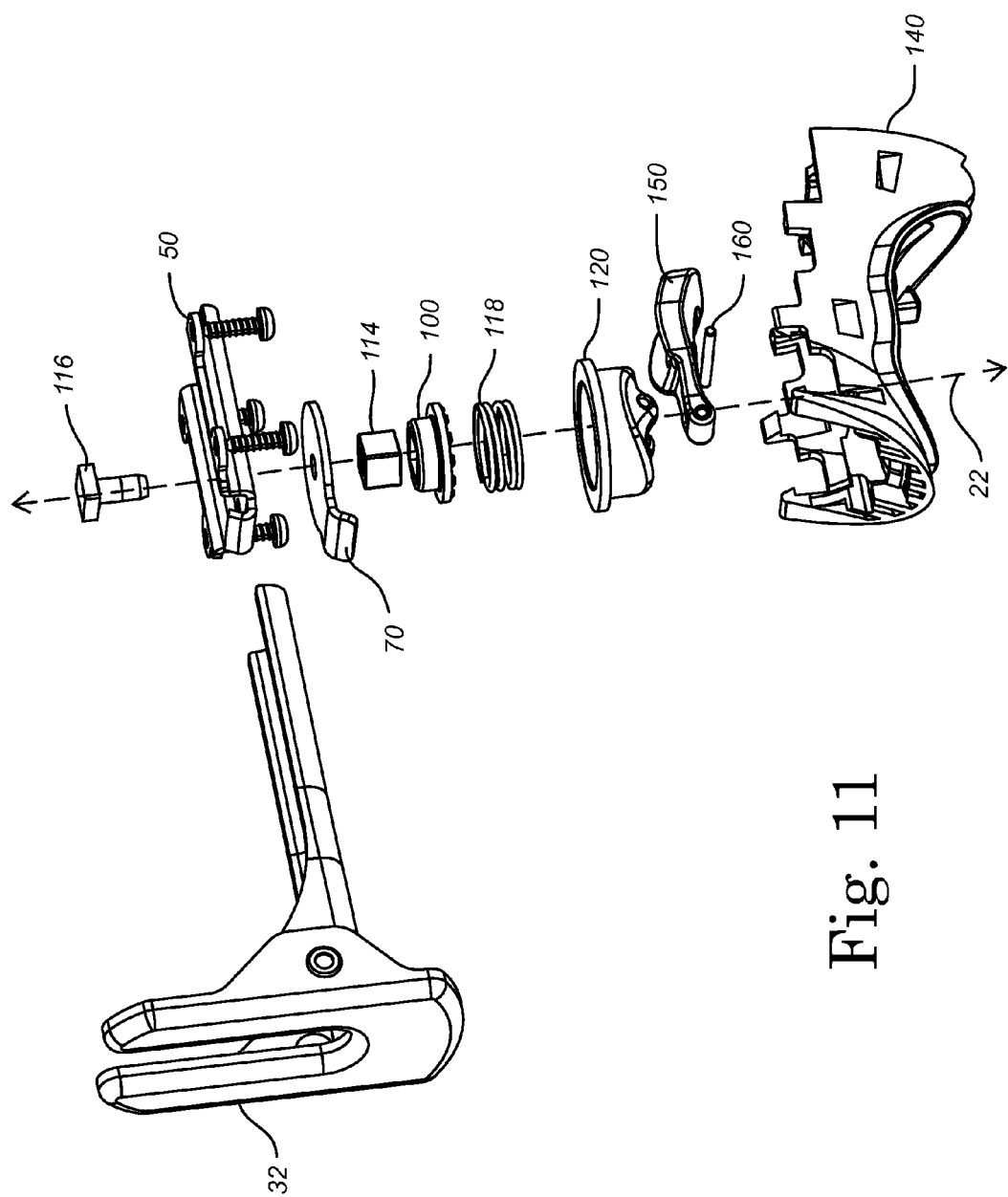
FIG. 11 shows an exploded isometric view of an alternative embodiment of the support foot locking arrangement of FIG. 2.

FIG. 11 shows an alternative embodiment of the support foot locking arrangement 30. In this embodiment, the clutch plate 80 is removed and the ratchet arrangement is provided between teeth positioned on the underside of the ratchet disc 100 and complementary teeth positioned on an upward facing surface of the adjustment knob 120. While this particular ratchet arrangement is shown in FIG. 11, it will be recognized that other ratchet arrangements may be used for the embodiment of FIG. 11, such as the ratchet arrangement described for the previous embodiment (i.e., the embodiment of FIGS. 1-10). Similarly, for the previous embodiment, it will be recognized that the ratchet arrangement of FIG. 11 or other ratchet arrangements are also possible.

In the embodiment of FIG. 11, the adjustment knob 120 is rotatable about the shaft axis 22, but, in contrast to the embodiment of FIGS. 1-10, the adjustment knob 120 in the embodiment of FIG. 11 is always retained within the support plate 140. Accordingly, the adjustment knob 120 does not move along the shaft axis 22 between one position where the adjustment knob is retained within the support plate 140 and another position where the adjustment knob protrudes from the support plate. Because the adjustment knob 120 does not protrude from the support plate 140 in this embodiment, the adjustment knob 120 is not readily accessible, and a mechanism is added to facilitate rotation of the adjustment knob 120. In particular, a lever 150 is pivotably attached to the bottom portion of the adjustment knob 120.

Figure 12:
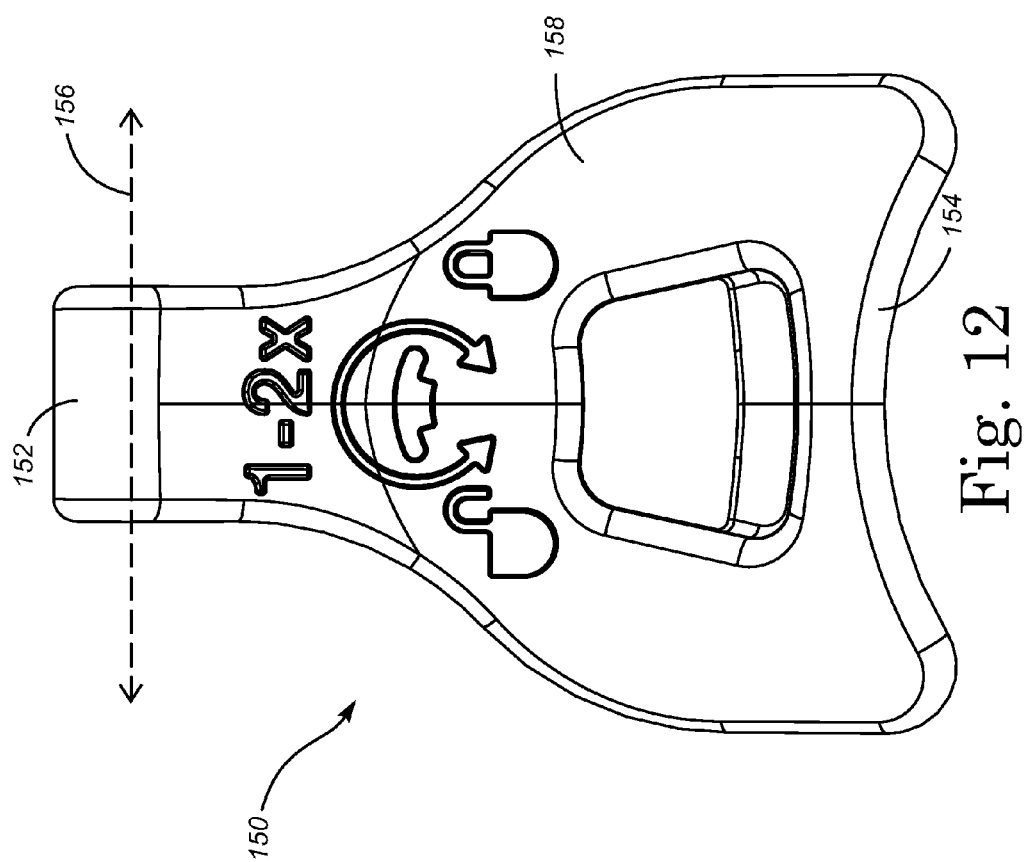
FIG. 12 shows a bottom view of the lever for the support foot locking arrangement of FIG. 11.

As shown in FIG. 12, the lever 150 includes a small pivoting end 152 and an enlarged grip end 154. The small pivoting end 152 is pivotably mounted to the adjustment knob using a pin 160 (see FIG. 11) that is retained within a bearing formed in the adjustment knob 120. The pin 160 is positioned at pivot axis 156 on the lever 150 and extends through a hole in the lever and into the bearing of the adjustment knob 120.

The lever 150 is pivotable on the adjustment knob 120 between a closed position and an open position. In the closed position, the grip end 154 of the lever 150 is retained close to the support plate 140 and is positioned within a seat 162 (see FIG. 13) on the support plate 140. The lower surface 158 of the lever 150 is contoured to match the general contour of the support plate 140 that would exist except for the seat 162 in the support plate. Accordingly, when the lever 150 is in the closed position, the lever 150 and support plate 140 together provide the user with a generally smooth flowing surface that is free of substantial protruding members. A snap hook arrangement may be provided in the lever seat 162 of the support plate 140 to ensure that the lever 150 stays in place in the closed position during tool operation.

Figure 13:
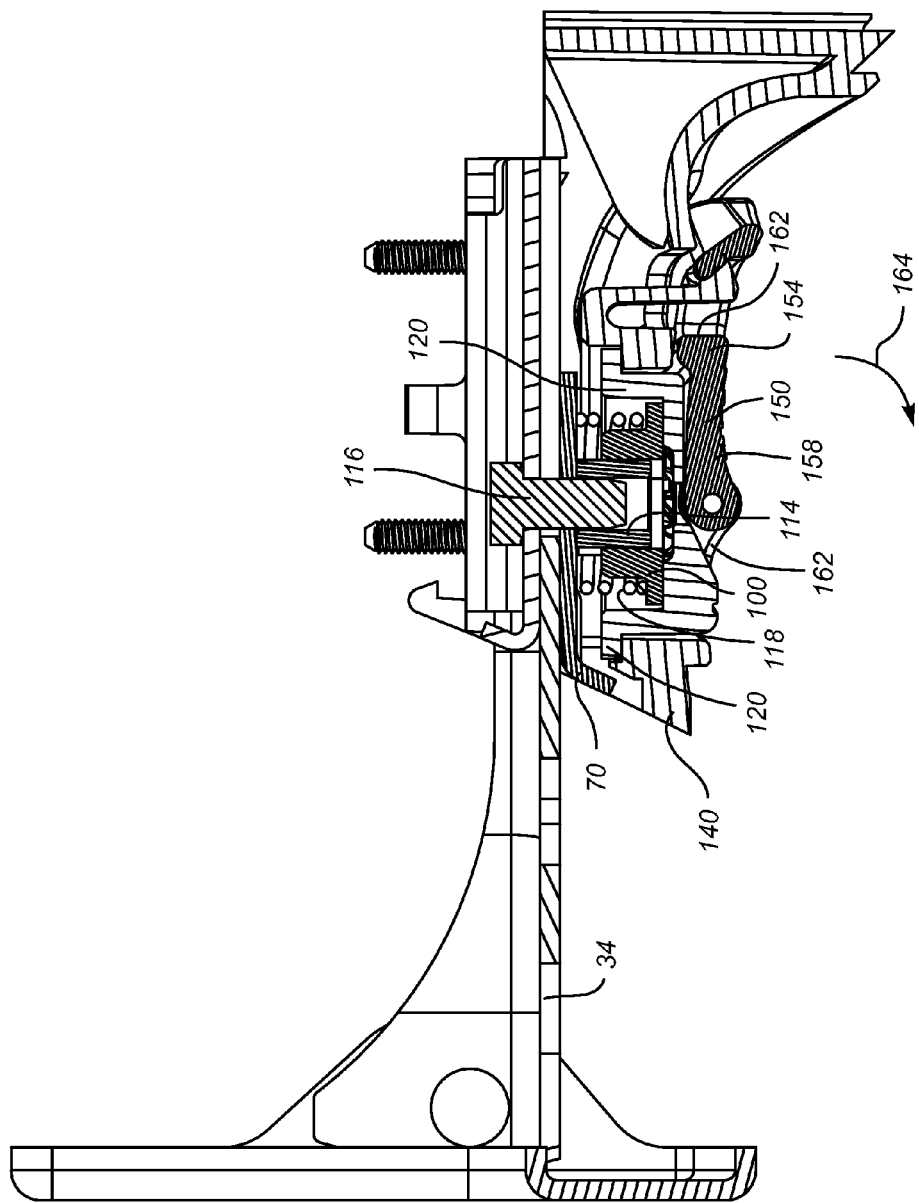
FIG. 13 shows a cross-sectional view of the assembled support foot locking arrangement of FIG. 11.

In order to move the lever 150 to the open position, the lever is pivoted as indicated by arrow 164 in FIG. 13 such that the grip end 154 of the lever projects outward from the surface of the support plate 140. With the grip end 154 of the lever extended away from the support plate 140, the lever 150 may be rotated about the shaft axis 22 (see FIG. 11) in order to rotate the adjustment knob 120. The user rotates the lever 150 in the clockwise direction until the ratchet mechanism begins to click, indicating that the clamping nut 114 is applying the maximum clamping force. The lever 150 is then pivoted back to the closed position, opposite the direction of arrow 164, and out of the user's way during tool operation.

When the user wishes to remove the clamping force from the foot guide plate 34, the user moves the lever 150 again to the open position and rotates the lever 150 in the counter-clockwise direction until clearance is provided between the thrust plate 70 and the locking plate 50 such that the foot guide plate 34 may slide to the desired position within the tool 10. Accordingly, the lever 150 provides the user with a convenient mechanism for rotating the adjustment knob 120 and tightening or loosening the clamping nut 114 in the support foot locking arrangement 30.

Although the present invention has been described with respect to certain preferred embodiments, it will be appreciated by those of skill in the art that other implementations and adaptations are possible. For example, the locking holes on the locking plate could be easily replaced with locking protrusions, and the locking protrusions on the foot guide plate could be easily replaced with locking holes. As another example, additional numbers or configurations of locking protrusions and locking holes could be provided. As yet another example, the foot guide could be provided using rods or other members other than a plate. Numerous other alternative embodiments are also possible and will be recognized. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A support arrangement for a reciprocating tool defining a tool axis, the support arrangement comprising:
    a first locking surface;
    a support foot assembly including a second locking surface provided adjacent to the first locking surface, the second locking surface configured to engage the first locking surface in a locking engagement;
    a shaft defining a shaft axis oriented substantially orthogonal to the tool axis, the shaft extending between the first locking surface and the second locking surface; and
    an adjustment mechanism positioned on the shaft, the adjustment mechanism configured to move upon the shaft and clamp the first locking surface and second locking surface together,
    wherein the shaft comprises a threaded shaft and the adjustment mechanism comprises a nut threadedly engaging the shaft.

2. The support arrangement of claim 1 wherein the adjustment mechanism further comprises a knob, wherein rotation of the knob results in rotation of the nut on the threaded shaft.

3. The support arrangement of claim 2 wherein the knob is configured for rotation between an unlocked position and a locked position, wherein a clearance is available in a direction of the shaft axis between the first locking surface and the second locking surface when the knob is in the unlocked position, and wherein the clearance is removed when the knob is in the locked position.

4. The support arrangement of claim 2 wherein the adjustment mechanism comprises a ratchet arrangement that limits a tightening of the nut to an application of a maximum torque regardless of a degree of knob rotation.

5. The support arrangement of claim 2 wherein the knob is moveable along the axis of the shaft between an open position and a closed position, wherein the knob is configured to rotate the nut on the shaft in the open position.

6. The support arrangement of claim 5 wherein the knob is positioned within an opening in a support plate of the reciprocating tool, and wherein the knob protrudes further outward from the support plate in the open position than in the closed position.

7. The support arrangement of claim 6 further comprising a spring configured to bias the knob toward the open position.

8. The support arrangement of claim 1 further comprising a lever configured to move between an open position and a closed position, the lever configured to rotate a knob of the adjustment mechanism when in the open position.

9. The support arrangement of claim 1 wherein:
    the first locking surface includes a plurality of recesses,
    the second locking surface includes a plurality of protrusions, and
    the locking engagement between the first locking surface and the second locking surface occurs in response to the plurality of recesses engaging the plurality of protrusions.

10. The support arrangement of claim 1 wherein the first locking surface is provided on a locking plate that is fixed to the reciprocating tool and the second locking surface is provided on an extension plate of the support foot assembly.

11. A support arrangement for a reciprocating tool, the support arrangement comprising:
   a first locking surface;
   a support foot assembly including a second locking surface provided adjacent to the first locking surface, the second locking surface configured to engage the first locking surface in a locking engagement;
   an adjustment mechanism configured to clamp the first locking surface to the second locking surface with a clamping force, the adjustment mechanism including a ratchet arrangement configured to limit an amount of the clamping force that can be provided by the adjustment mechanism.

12. The support arrangement of claim 11 wherein the adjustment mechanism comprises a shaft extending between the first locking surface and the second locking surface and a rotatable member moveable upon the shaft, the shaft defining a shaft axis.

13. The support arrangement of claim 12 wherein the rotatable member is a nut threadedly engaging the shaft, wherein the ratchet arrangement limits the amount of the clamping force that can be provided by the adjustment mechanism by limiting the rotation of the nut on the shaft to an application of a maximum torque.

14. The support arrangement of claim 13 wherein the ratchet arrangement comprises an inner portion engaging the nut and an outer portion engaging the inner portion, wherein teeth provided on the outer portion slide over teeth provided on the inner portion when the maximum torque is applied.

15. The support arrangement of claim 12 further comprising an adjustment knob configured to rotate the rotatable member upon the shaft, wherein the adjustment knob is moveable along the shaft axis between an open position and a closed position.

16. The support arrangement of claim 15 wherein the adjustment knob is provided in a hole in a support plate of the reciprocating tool, wherein the adjustment knob protrudes further from the support plate in the open position than in the closed position.

17. A reciprocating tool comprising:
   a reciprocating member defining a tool axis;
   a locking plate fixed on the reciprocating tool, the locking plate including a first locking surface;
   a foot guide releasably engaging the locking plate, the foot guide including a second locking surface that interlocks with the first locking surface;
   a shaft defining a shaft axis oriented substantially orthogonal to the tool axis, the shaft extending between the first locking surface and the second locking surface; and
   an adjustment mechanism configured to clamp the first locking surface to the second locking surface with a clamping force, the adjustment mechanism including a ratchet arrangement that limits an amount of the clamping force that can be provided by the adjustment mechanism.

18. The reciprocating tool of claim 17 wherein the adjustment mechanism comprises an adjustment knob and the ratchet arrangement comprises a ratchet disc retained within the adjustment knob, wherein the adjustment knob is configured to rotate the ratchet disc, and wherein rotation of the ratchet disc is configured to clamp the first locking surface to the second locking surface with the clamping force.

19. The reciprocating tool of claim 18 wherein the adjustment knob is provided in a hole in a support plate fixed to the reciprocating tool, the adjustment knob moveable between an open position and a closed position, wherein rotation of the adjustment knob is configured to rotate the ratchet disc when the adjustment knob is in the open position, and wherein the adjustment knob protrudes further from the support plate in the open position than in the closed position.

* * * * *